United States Patent [19]

Fukui et al.

[11] 4,011,298

[45] Mar. 8, 1977

[54] METHOD FOR SIMULTANEOUS REMOVAL OF $SO_x$ AND $NO_x$

[75] Inventors: Suguru Fukui, Tokyo; Haruo Nishino, Kawasaki; Yohji Kameoka, Tokyo; Junichi Miyazaki, Fujisawa; Toshia Kuroda, Kawasaki, and Shinichi Konishi, Tokyo, all of Japan

[73] Assignee: Chiyoda Chemical Engineering & Construction Co. Ltd., Yokohama, Japan

[22] Filed: Dec. 16, 1974

[21] Appl. No.: 533,294

[30] Foreign Application Priority Data

Dec. 18, 1973 Japan ............................. 48-140363

[52] U.S. Cl. ............... 423/235; 423/242; 423/393; 423/555

[51] Int. Cl.² .......................................... C01B 21/00

[58] Field of Search .......... 423/235, 242, 402, 393

[56] References Cited

UNITED STATES PATENTS

| | | | |
|---|---|---|---|
| 1,420,477 | 6/1922 | Fairlig | 423/242 |
| 1,609,872 | 12/1926 | Garner et al. | 423/242 |
| 2,021,548 | 11/1935 | Goodeve | 423/242 |
| 2,021,936 | 11/1935 | Johnstone | 423/242 |
| 3,710,548 | 1/1973 | Goughlin | 423/402 |
| 3,760,061 | 9/1973 | Hammond | 423/242 |
| 3,773,897 | 11/1973 | Fields et al. | 423/235 |
| 3,836,630 | 9/1974 | Noguchi et al. | 423/242 |
| 3,848,058 | 11/1974 | Poncet et al. | 423/242 |

*Primary Examiner*—G. O. Peters
*Assistant Examiner*—Eugene T. Wheeler
*Attorney, Agent, or Firm*—Oblon, Fisher, Spivak, McClelland & Maier

[57] ABSTRACT

Waste gas containing sulfur oxide ($SO_x$) and nitrogen oxide ($NO_x$) is mixed with an ozone-containing gas to have the value $x$ of $NO_x$ fall in the range of 1.2 to 2.5 and thereafter brought into contact with an aqueous solution containing sulfuric acid, nitric acid and an iron compound to be deprived of $SO_x$ and $NO_x$. To the solution with which the waste gas has been brought into contact, air or oxygen is added to effect oxidation of the part of said oxides still remaining therein in an unoxidized state and regenerate the activity of the iron compound functioning as a catalyst. Part of the solution to which the addition of air or oxygen has been made is recycled as the solution for the purpose of contact with waste gas.

4 Claims, 7 Drawing Figures

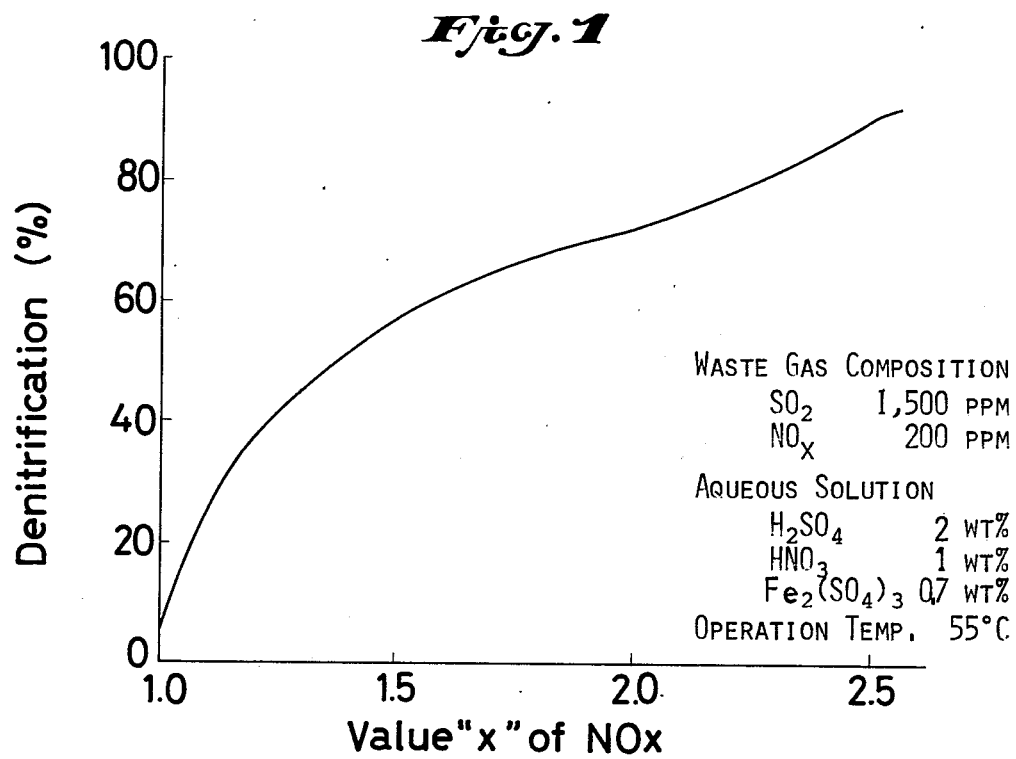
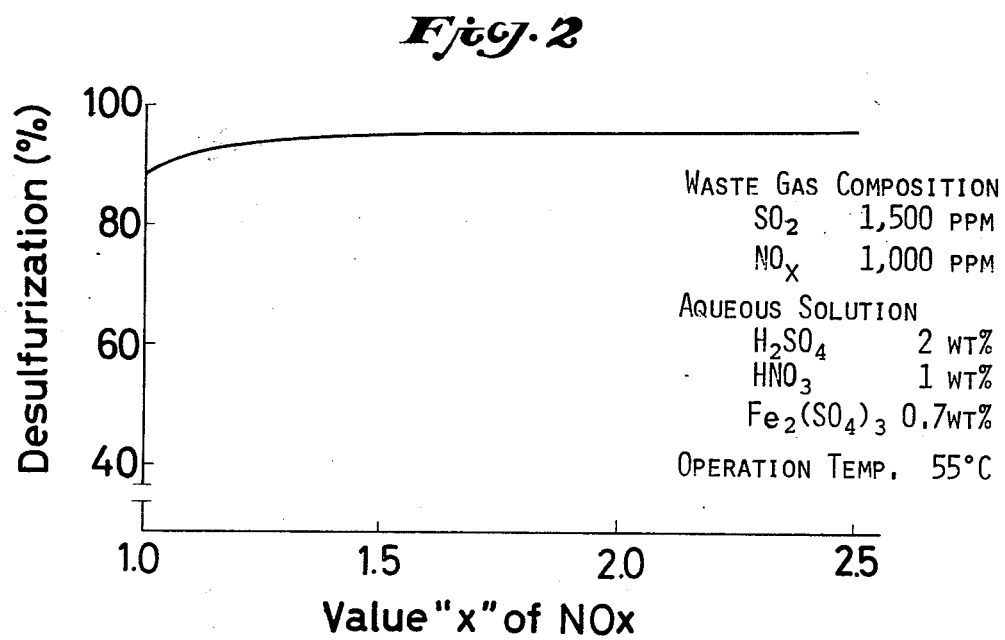

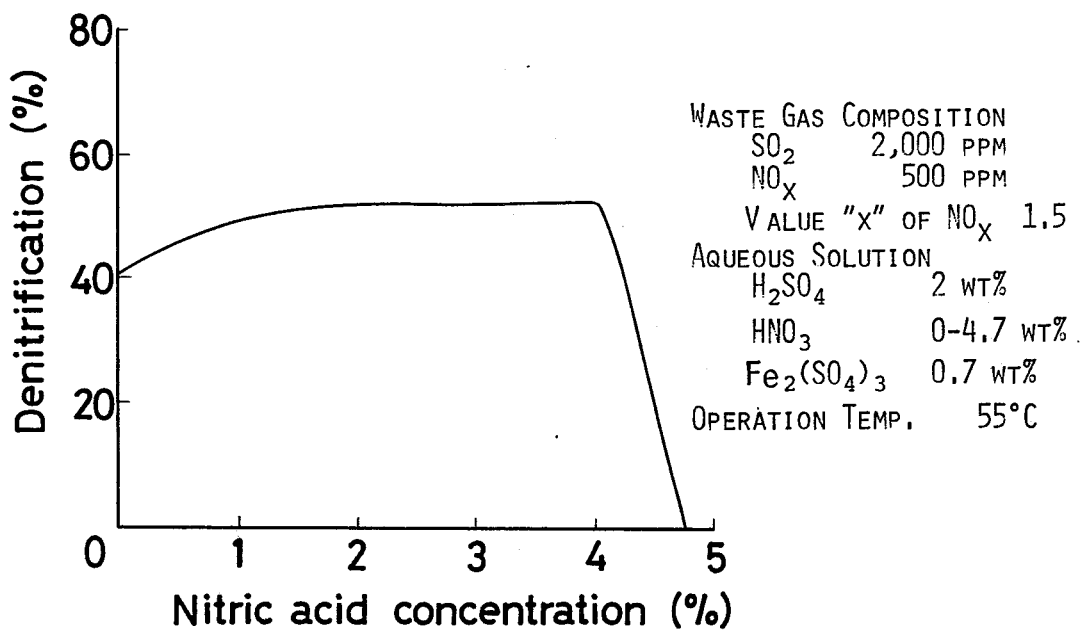
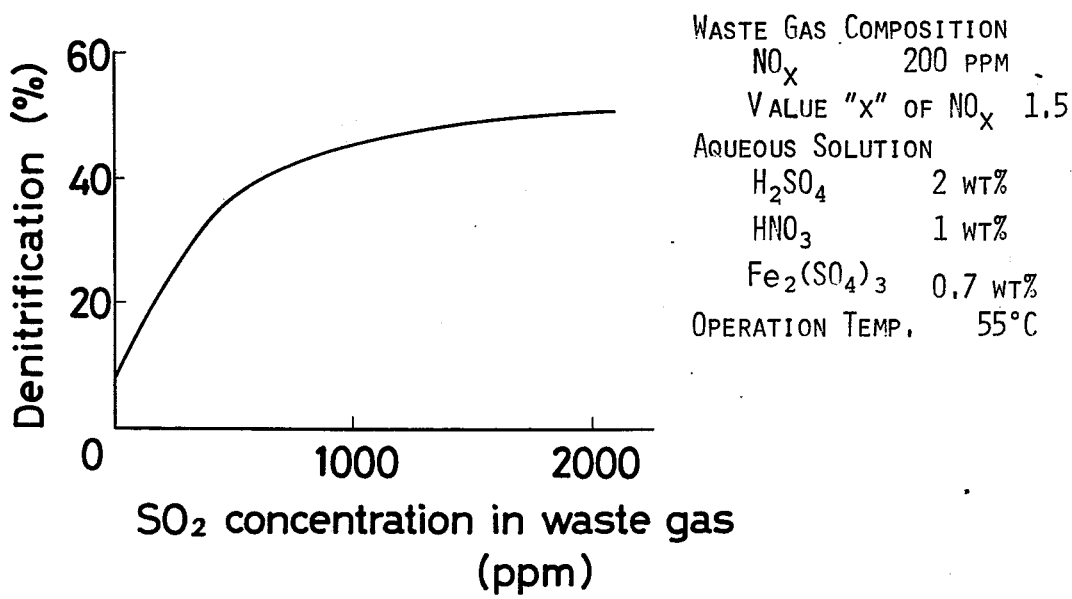

METHOD FOR SIMULTANEOUS REMOVAL OF $SO_x$ AND $NO_x$

BACKGROUND OF THE INVENTION

This invention relates to a method for simultaneous removal of $SO_x$ and $NO_x$ from waste gas containing these oxides. More particularly, this invention relates to a method whereby sulfur oxide, $SO_x$ ($SO_2$ and $SO_3$), and nitrogen oxide, $NO_x$ (NO and $NO_2$), which are air pollutants contained in minute amounts in the waste gas issuing from a boiler using a fossil fuel such as heavy oil or coal are simultaneously removed from said waste gas by use of an aqueous solution containing sulfuric acid, nitric acid and an iron compound as a catalyst.

For the removal of $SO_x$ from waste gas containing this oxide, various methods (such as those disclosed by U.S. Pat. No. 2,021,936 and 3,836,630, for example) have already been suggested and put to actual use. As regards the removal of $NO_x$ which is a substance causing photochemical smog and other types of environmental pollution, particularly in the treatment of large amounts of waste smoke from combustion of fossil fuels, there has not yet bee proposed any feasible method.

A primary object of the present invention, therefore, is to provide a commerically feasible method for enabling simultaneous removal of $SO_x$ and $NO_x$ present in the waste gas in a manner which is advantageous in terms of operation and economy.

SUMMARY OF THE INVENTION

To accomplish the object described above according to the present invention, there is provided a method which comprises a step for ozone addition wherein an ozone-containing gas is added to the waste gas containing $SO_x$ and $NO_x$ so as to have the value $x$ of $NO_x$ fall in the range of from 1.2 to 2.5, a first treatment step wherein the waste gas which has undergone the ozone addition step is brought into contact in a first zone with an aqueous solution containing sulfuric acid, nitric acid and an iron compound as the catalyst so as to deprive said waste gas of $SO_x$ and $NO_x$, a step for passing the solution resulting from said first treatment step from the first zone to a second zone by a path for passing, a second treatment step wherein air or oxygen is introduced and brought into contact with the solution resulting from said first treatment step so as to effect oxidation of the part of said oxides still remaining in an unoxidized state therein and regeneration of the activity of iron compound as a catalyst, a step for recycling the solution resulting from said second treatment step from said second zone to said first zone by a path for recycling which together with said path for passing establishes a path for circulation, a step for solution withdrawal wherein part of the solution in motion through said circulation path is removed from a desired position in said recycling step so as to remove sulfuric acid and nitric acid accumulated in the solution in consequence of absorption of $SO_x$ and $NO_x$, and a step for makeup wherein the solution in motion through the circulation path is made up with water and iron compound, whereby the concentrations of sulfuric acid, nitric acid and iron compound in the solution within said circulation path are maintained respectively at fixed levels by virtue of said withdrawal step and said makeup step and, as a consequence, the waste gas is continuously deprived of $SO_x$ and $NO_x$ by means of said series of steps.

Thus, the present method permits the $SO_x$ and $NO_x$ to be removed simultaneously and continuously from the waste gas by virtue of said series of operational steps. It is very simple and effective as a process for removal of the $SO_x$ and $NO_x$ and enjoys an economical advantage.

The other object and characteristic features of the present invention will become apparent from the detailed description to be given herein below with reference to the accompanying drawing.

BRIEF EXPLANATION OF THE DRAWING

FIG. 1 is a graph showing typical data on the relation between the value of $x$ indicating the degree of oxidization of $NO_x$ and the percentage of denitrification as determined when the waste gas containing $SO_x$ and $NO_x$ is subjected to the treatment for refining after addition of ozone according to the method of this invention.

FIG. 2 is a graph showing typical data on the relation between the value $x$ of $NO_x$ and the percentage of desulfurization as determined when the waste gas containing $SO_x$ and $NO_x$ is similarly subjected to the treatment for refining after addition of ozone according to the method of this invention.

FIG. 3 is a graph showing typical data on the relation between the concentration of nitric acid in the aqueous solution used as the absorbent and the percentage of denitrification observed when the waste gas is treated by the method of this invention.

FIG. 4 is a graph showing typical data on the relation between the concentration of $SO_2$ in the waste gas and the percentage of denitrification observed when the waste gas is treated by the method of this invention.

DETAILED DESCRIPTION OF THE INVENTION

Figure 5:
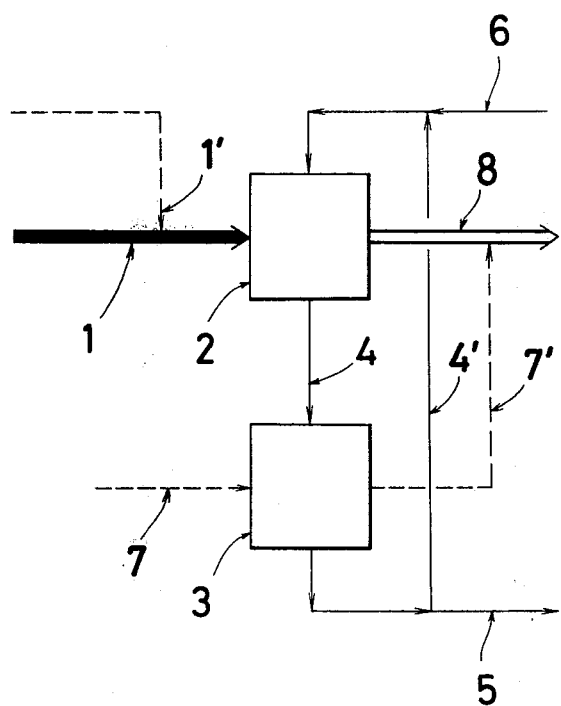
FIG. 5 is a basic flow diagram of the process of the present invention.

The inventors pursued a devoted research after a method for the removal of $NO_x$, particularly for the simultaneous removal of $NO_x$ and $SO_x$, from the waste gas. Consequently they have discovered an excellent method for accomplishing this object very simply and effectively. The principle, technical construction, preferred embodiments and characteristic features of the method of the present invention will be described herein below.

The method of this invention comprises a step for ozone addition wherein an ozone-containing gas is added to the waste gas containing $SO_x$ and $NO_x$ so as to have the value $x$ of $NO_x$ fall in the range of from about 1.2 to about 2.5, a first treatment step wherein the waste gas which has undergone the ozone addition step is brought into contact in a first zone with an aqueous solution containing sulfuric acid, nitric acid and an iron compound as the catalyst so as to deprive said waste gas of $SO_x$ and $NO_x$, a step for passing the solution resulting from said first treatment step from the first zone to a second zone by a path for passing, a second treatment step wherein air or oxygen is introduced and brought into contact with the solution resulting from said first treatment step so as to effect oxidation of the part of said oxides still remaining in an unoxidized state therein and regeneration of the activity of iron compound as a catalyst, a step for recycling the solution resulting from said second treatment step from said second zone to said first zone by a path for recycling which together with said path for passing establishes a path for circulation, a step for solution withdrawal wherein part of the solution in motion through said circulation path is removed from a desired position in said recycling step so as to remove sulfuric acid and nitric acid accumulated in the solution in consequence of absorption of $SO_x$ and $NO_x$, and a step for makeup wherein the solution in motion through the circulation path is made up with water and iron compound, whereby the concentrations of sulfuric acid, nitric acid and iron compound in the solution within said circulation path are maintained respectively at fixed levels by virtue of said withdrawal step and said makeup step and, as a consequence, the waste gas is continuously deprived of $SO_x$ and $NO_x$ by means of said series of steps.

Waste gases which occur in the combustion of fossil fuels such as heavy oil and coal generally contain several tens to several thousands of ppm of $SO_x$ and several tens to several hundreds of ppm of $NO_x$, depending on the kind of fuel, the condition of combustion, etc. The $NO_x$ is generally made up of more than 90% of NO and the remainder of $NO_2$ to make up 100%.

When ozone is added to the waste gas in the ozone addition step in the method of this invention, the $NO_x$ undergoes oxidation as indicated by the following reaction formulas.

$$NO + O_3 \rightarrow NO_2 + O_2 \quad (1)$$

$$2NO_2 + O_3 \rightarrow N_2O_5 + O_2 \quad (2)$$

In this case, the reaction velocity is greater in the reaction of the formula (1) than in the reaction of the formula (2). The added ozone, therefore, is consumed first in the reaction of the formula (1). For this reason, the proportions of NO, $NO_2$ and $N_2O_5$ in the waste gas can be regulated as desired by adjusting the amount of ozone to be added for the oxidation. In the method of this invention, this regulation of the proportions is generally effected so that the value $x$ of $NO_x$ falls in the range of from 1.2 to 2.5. As is clear from the typical data given in FIG. 1, the percentage of denitrification increases in proportion as the value of $x$ of $NO_x$ increases. The value of $x$ of $NO_x$ also affects the percenaage of desulfurization attained as shown in FIG. 2. The effect of the simultaneous treatment wherein the existence of $NO_x$ produces an advantageous influence on the removal of $SO_x$, will be described in further detail later.

The reaction between the coexistent $SO_x$ and the added ozone proceeds at an extremely low velocity. It has been confirmed through experiments that even when the aforementioned reaction is effected by introducing ozone in an amount such that the $x$ of $NO_x$ assumes a value of 2.5, $SO_x$ remains entirely unoxidized and, consequently, $NO_x$ can be preferentially oxidized.

As regards the temperature at which the desired reaction is attained, since in the wet treatment of the waste gas, there is generally incorporated a water-washing step for the purpose of dust treatment of the waste gas, the reaction can be practiced at temperatures at which the waste gas is discharged from this water-washing step, namely at temperatures in the range of from ambient temperature (about 15°–25° C) to about 100° C. Owing to the fact that the reaction efficiency is degraded increasingly more by the auto-decomposition reaction of ozone in proportion to the increase in the temperature of the reaction, however, the reaction is generally carried out at temperatures in the range of from ambient temperature to 80° C.

The waste gas which has undergone the reaction effected by the addition of the ozone-containing gas is then led to the first treatment step wherein it is brought into contact with an aqueous solution containing sulfuric acid, nitric acid and iron compound as the catalyst, so that it is washed with said aqueous solution and consequently deprived of $SO_x$ and $NO_x$ and thereafter released. The concentration of sulfuric acid in the aqueous solution thus used has substantially no effect upon the denitrification reaction. For the purpose of desulfurization, high concentration of sulfuric acid is undesirable because the percentage of desulfurization decreases with the increasing sulfuric acid concentration. Thus, the preferable sulfuic acid concentration is generally on the order of 0.5 to 10%, although it is variable with the concentrations of $SO_x$ and $NO_x$ in the waste gas being treated, the concentration of nitric acid, the particular kind and concentration of the iron compound being used as the catalyst, temperature and other conditions of treatment.

Nitric acid is one of the important consitutent elements of the solution to be used for the method of this invention. The inventors have confirmed that as shown by the typical data on the effect of nitric acid given in FIG. 3, the percentage of dentirification is low where there is used an aqueous solution excluding nitric acid or containing iron compound and sulfuric acid only and the percentage is heightened where the aqueous solution further incorporates nitric acid to a certain concentration Since the percentage of denitrification sharply falls after concentration of nitric acid in the aqueous soluton has passed a certain level as indicated in FIG. 3, the denitrification of the waste gas can efficiently be carried out by suitably regulating the nitric acid concentration by virtue of the withdrawal step to be described afterward.

The preferable nitric acid concentration is generally about 0.05 to 4% in the treatment of the waste gas from ordinary boilers, although it is variable with the sulfuric acid concentration in the solution, the particular kind and concentration of the iron compound serving as the catalyst, the concentrations of $NO_x$ and $SO_x$ in the waste gas being treated and other conditions of treatment. The iron compounds which are usable as the catalyst include ferrous salts and ferric salts and various iron compounds capable of forming such salts upon dissolution in said absorption liquid. For such iron compound, the compounds in the form of iron sulfates or iron nitrates for example are generally advantageous. As will be described later, the ferrous salts are oxidized in the second zone to ferric salts which are effective as catalysts.

Although the concentration of such iron compound in the solution is variable with the concentrations of sulfuric acid and nitric acid, the concentrations of $SO_x$ and $NO_x$ in the waste gas, and temperature and other conditions of treatment involved, a sufficient effect is obtained by using the iron compound at a concentration of about 50 to 6,000 ppm as ferric ion in the treatment of the waste gas from ordinary boilers.

At a concentration below the lower limit of said range, the effect to be derived is less than is desired. At a concentration exceeding the upper limit of the range, however, the effect to be derived is substantially the same as when the concentration is in the specified range.

The washing treatment can generally be carried out at temperatures ranging from ambient temperature up to the boiling point of said aqueous solution.

Said aqueous solution which has undergone the first treatment step is now led to the second treatment step for contact with air or oxygen being introduced therein. In this step, the $SO_x$ and $NO_x$ which have been absorbed into the aqueous solution in the first treatment step and are still remaining partially in an unoxidized state and part of the iron compound which has been degraded in the degree of oxidation because of the reaction in the first treatment step are subjected to oxidation under a higher partial pressure of oxygen than the partial pressure of the residual oxygen in the waste gas in the first treatment step.

The operation during this second treatment step can be carried out at temperatures generally ranging from ambient temperature up to the boiling point of said aqueous solution.

The solution which has undergone the second treatment step is recycled to the first treatment step for use in the washing treatment. Thus a circulation path is formed between the first treatment step and the second treatment step.

$SO_x$ and $NO_x$ in the waste gas which has undergone the ozone addition treatment is, therefore, subjected to the series of treatments in the first and the second treatment steps, so that $SO_x$ is oxidized into sulfuric acid and part of the $NO_x$ is oxidized into nitric acid and the remainder thereof is reduced to nitrogen, nitrous oxide, etc. which are innocuous gases involving no problem from the standpoint of environmental pollution. These unharmful gases are released into the atmosphere together with the waste gas.

It is well known that when a continuous treatment is performed in a series of steps connected by a circulation path, it is not generally practical to discriminate the function of reaction of the first treatment step from that of the second treatment step by drawing a definite borderline therebetween, since the reaction proceeds continuously. Nevertheless, venturing an explanation in this respect, the function of the reaction in the first treatment step lies chiefly in the absorption of $SO_x$ and the subsequent partial oxidation of the absorbed $SO_2$ into sulfuric acid, the absorption of $NO_x$ and the subsequent partial oxidation of the absorbed $NO_x$ into nitric acid and formation of nitrogen and nitrous oxide due to the reduction of the remainder of the absorbed $NO_x$. And the function of the reaction of the second treatment step lies chiefly in oxidation of those substances which have remained in unoxidized form during the first treatment step, and in oxidative activation of the iron ions, which have been degraded in the degree of oxidation owing to having taken part in the said oxidation reaction, specifically in formation of $Fe^{+++}$ from $Fe^{++}$. Therefore, with particular attention attached to the principal functions involved respectively in these steps, it is permissible to call the first treatment step an absorption step and the second treatment step an oxidation step.

What should be noted in particular with respect to the treatment involved in the series ranging from the ozone addition step through the first and second treatment steps in the method of this invention is the fact that the inventors have discovered the following new principles which constitute a part of the backbone of the method of this invention.

(1) When the treatment of the waste gas is carried out by using the aqueous solution according to the method of this invention in which the degree of oxidation of $NO_x$ is heightened or the value of $x$ in the $NO_x$ is increased by the ozone oxidation, the percentage of denitrification is higher or the denitrification can be effected with a higher efficiency than when the treatment is carried out by excluding the ozone oxidation and therefore permitting the waste gas to retain $NO_x$ in its unaltered form.

2. In the treatment of the waste gas by use of the aqueous solution according to the method of this invention, the percentage of denitrification is higher because of the coexistence effect of $SO_2$ when the treatment is carried out on the waste gas in which $SO_2$ is still coexistent then when the treatment is performed on the waste gas which has been deprived of $SO_2$ in advance and which therefore containing $NO_x$ substantially exclusively. Further, the percentage of denitrification to be obtained increases with the increasing concentration of $SO_2$ which is in coexistence.

3. When the treatment is performed by using the aqueous solution according to the method of this invention while $NO_x$ having its $x$ value increased by the ozone oxidation is made to coexist in the waste gas containing $SO_2$, the desulfurization can be obtained at a higher percentage, because of the coexistent effect of $NO_x$ of a higher degree of oxidation, than when the treatment is carried out on waste gas in which $NO_x$ has not undergone the ozone oxidation and therefore remains in its unaltered form.

The discovery of Item (1), which is depicted by the typical data given in FIG. 1, has already been explained.

As to the Items (2) and (3), although it is of course feasible to effect denitridication and desulfurization of the waste gas by first depriving the waste gas of either $SO_x$ or $NO_x$ by some other means in advance and thereafter subjecting the waste gas now containing the remaining oxide to the treatment according to the method of this invention, it has been ascertained that desulfurization and denitrification can be obtained at higher percentages because of the mutual coexistent effect when the waste gas containing both oxides simultaneously are treated by the process of this invention than when the waste gas is subjected to the aforementioned two separate treatments, one for the removal of $SO_x$ and the other for the removal of $NO_x$.

FIG. 4 and FIG. 2 give typical data illustrating this relationship. FIG. 4 represents typical data showing the relation between the concentration of $SO_2$ coexisting with $NO_x$ in the waste gas and the percentage of denitrification obtained by the treatment of the waste gas according to the method of this invention. It is clearly seen from this graph that the percentage of denitrification is higher when $SO_2$ is coexistent in the waste gas than when no $SO_2$ is coexistent therein and further that the percentage of denitrification is increased with the increasing concentration of the coexistent $SO_2$.

FIG. 2 represents typical data illustrating the relation between the value $x$ of $NO_x$ coexisting with $SO_x$ within the waste gas and the percentage of desulfurization obtained by treating this waste gas in accordance with the method of this invention. A study of this graph clearly reveals that the percentage of desulfurization is higher when the value $x$ of $NO_x$ contained in the waste gas is increased by the ozone oxidation than when the value $x$ of $NO_x$ is in the neighborhood of 1.0 which is the value in the case that $NO_x$ has not undergone the ozone oxidation and therefore, remains unaltered.

The fact that the denitrification can be obtained at a higher percentage when the treatment is given after the degree of oxidation of $NO_x$ has been increased by the ozone addition than when the treatment is given to the waste gas wherein $NO_x$ is retained in its unaltered from and the fact that removal of $SO_x$ and $NO_x$ can be effected with a decidedly higher efficiency when the waste gas containing the oxides simultaneously is treated at once by the method of this invention than when the waste gas is subjected to two separate treatments for respective separation of $SO_x$ and $NO_x$ are both novel discoveries which form characteristic features of this invention. On account of these discoveries, both the process and operation involved are simplified to a great extent. Thus they may justly be called highly significant in terms of industrial technology and economy.

As described above, sulfuric acid and nitric acid formed by the reaction accumulate within the aqueous solution in the course of the circulation system and, consequently, the concentrations of sulfuric acid and nitric acid within the aqueous solution in use gradually rise. In order to regulate these concentrations at fixed levels, therefore, part of said aqueous solution is withdrawn from the recycling step in the withdrawal step and, at the same time, the aqueous solution is made up with supplies of iron compound and water in the makeup step via the circulation path.

Thus, in the circulation path, the treatment is carried out continuously maintaining the concentrations of each component in the aqueous solution constantly at fixed levels.

Both withdrawal and makeup can be effected at any desired positions in the entire circulation path.

The aqueous solution which has been withdrawn in the withdrawal step can subsequently be treated by a desired method for further treatment of sulfuric acid, nitric acid and iron compound contained therein.

For example, the removed aqueous solution may be treated as with limestone or slaked lime to have the contained sulfuric acid converted into gypsum and the resultant mother liquid remaining after separation of the formed gypsum may be neutralized as with caustic soda to convert the contained nitric acid into sodium nitrate. The iron compound may be recovered by a suitable chemical operation such as, for example, pH adjustment, depending on the particular kind of iron compound in use.

To facilitate understanding of the method of this invention, the method of the present invention and preferred embodiments for commercially practicing the method of this invention will be described by reference to the process flow diagrams attached thereto.

FIG. 5 is a basic flow diagram illustrating the process of this invention.

Referring to FIG. 5, the waste gas containing $SO_x$ and $NO_x$ is subjected in a duct 1 to ozone addition through a line 1' (ozone addition step).

The waste gas in which $NO_x$ has its degree of oxidation elevated by the ozone addition is introduced into a zone 2 wherein it is brought into contact with the aqueous solution containing sulfuric acid, nitric acid and an iron compound as the catalyst and consequently is deprived of $SO_x$ and $NO_x$ (first treatment step). Then the waste gas thus stripped of the unoxious oxides is released into the atmosphere through a duct 8. For this contact of the waste gas with the aqueous solution, there may be employed a method of counter-flow contact or parallel-flow contact to be effected by use of an ordinary gas-liquid contact apparatus such as a packed column or a varying type of multi-shelved tower, for example. In the meantime, the aqueous solution which has made contact with the waste gas in the zone 2 is forwarded to a zone 3 through a line 4 (passing step), wherein it is exposed to air or oxygen supplying through a line 7 which acts to effect oxidation on $SO_x$ and $NO_x$ partly remaining in an unaltered from within the solution and to reactivate the catalyst having its catalytic capacity degraded in consequence of its participation as a catalyst in the oxidation during the first treatment step (second treatment step). Thus, the aqueous solution is completely regenerated, and then recycled as the absorbent to the zone 2 through a line 4' (recycling step).

As described above, a path for the circulation between the zones 2 and 3 is established by the lines 4 and 4'.

The air or oxygen which has served the purpose of oxidation in the second step is commingled via a line 7' into the treated waste gas discharged from the zone 2 and, in the mixed form, is released into the atmosphere through a duct 8. If the air or oxygen discharged from the zone 3 happens to entrain any impure gas, minute as it may be, it is permissible to have the gas mixed with the fresh waste gas treated at the first step so as to undergo the treatment of the first step once more.

Denoted by 5 is the withdrawal step for withdrawing part of the aqueous solution and by 6 is the make up step designed for allowing the liquid in motion through the circulation path to be made up with water and iron compound. These steps serve the purpose of withdrawing part of the aqueous solution from the recycling step and at the same time making up the remaining aqueous solution deficient in water and iron compound because of the partial withdrawal with water and catalyst equivalent to the withdrawn amounts, so that the concentrations of sulfuric acid and nitric acid in the aqueous solution in the circulation path which would otherwise be gradually heightened because of accumulation of said acids formed therein by the said reactions will be kept from increasing and the concentrations of individual components present in the aqueous solution will be regulated constantly at fixed levels.

Thus, the treatment is continuously carried out maintaining the concentrations of the individual components in the aqueous solution at constant levels in the circulation system. The step for withdrawal and the step for makeup can incorporated at any desired position within the circulation path.

Figure 6:
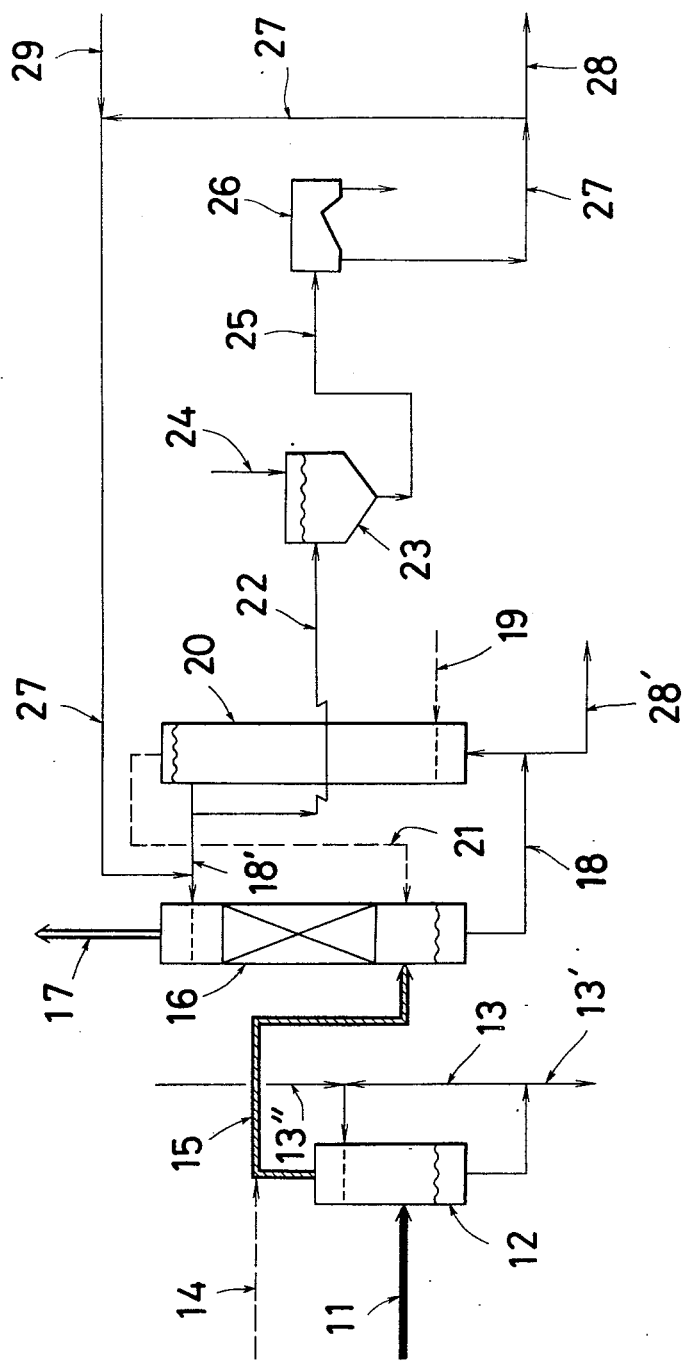
FIG. 6 is a process flow diagram illustrating one example of the commercial application of the method of this invention.

FIG. 6 is a flow diagram illustrating one preferred embodiment of the commercial application of the method of this invention.

Referring to FIG. 6, the waste gas containing $SO_x$ and $NO_x$ is fed through a duct 11 into a scrubbing cooler 12, wherein it is subjected to washing treatment with water or an aqueous solution so that it is deprived of entrained dust and at the same time cooled to 50° to 70° C.

The reference numeral 13 denotes a water circulation line for the scrubbing cooler, 13' a line for withdrawing water or aqueous solution from said water circulation line and 13" a line for allowing the water circulation line to be made up with water.

In a duct 15, the waste gas which has undergone the treatment by the scrubbing cooler 12 is subjected to incorporation of an ozone-containing gas introduced via a line 14 and, consequently, $NO_x$ present in the waste gas is oxidized. The reference numeral 16 denotes an absorption column used for effecting the first treatment step, 17 a duct for the treated waste gas, 20 an oxidation column used for effecting the second treatment step, 19 a line for delivery of air or oxygen to the oxidation column and 18 a path for passing the solution resulting from the first treatment step from the absorption column to the oxidation column (passing step), and 18' a path for recycling the solution resulting from the second step from the oxidation column to the absorption column (recycling step).

The operation and treatments involved in these steps for treating the waste gas which has undergone the ozone addition step are similar to those already described by reference to FIG. 5.

Denoted by 22 is one typical step employed for the withdrawal of part of the aqueous solution from the recycling path 18'. The aqueous solution withdrawn through this path is introduced into a gypsum crystallizer 23, in which it is mixed with milk of lime or limestone received through a line 24 so as to have the sulfuric acid in the aqueous solution crystallized out in the form of gypsum. The resultant slurry is led through a line 25 into a gypsum separator 26, wherein the crystallized gypsum is separated from the slurry. The mother liquor remaining after the removal of gypsum is returned through a line 27 to the recycling path 18'.

In order to regulate the concentration of nitric acid in the aqueous solution at a fixed level in the course of the recycling path, part of the mother liquor from the gypsum separator is withdrawn from the system through a withdrawal line 28 or part of the aqueous solution in the recycling path is withdrawn from the system through a withdrawal path 28' issuing from the passing path 18 and the aqueous solution deficient in water and catalyst because of the withdrawal is made up with water and catalyst equivalent to the withdrawn amounts through a makeup line 29.

The embodiment just described represents a method wherein the addition of the ozone-containing gas is made at one point between the scrubbing cooler and the absorption column. Since the proportion of NO to $NO_2$ increases in proportion as the absorption of $NO_x$ proceeds within the absorption column, additional ozone may be introduced to the absorption column interior for the purpose of attaining the denitrification at an increased percentage. Alternatively, multistage treatment of the waste gas is possible by a method wherein one absorption column or a plurality of absorption columns are additionally disposed subsequent to said absorption column to have the ozone-containing gas introduced again to the waste gas between these absorption columns so as to effect the desired elevation of the proportion of $NO_2$ to NO at a plurality of steps.

Figure 7:
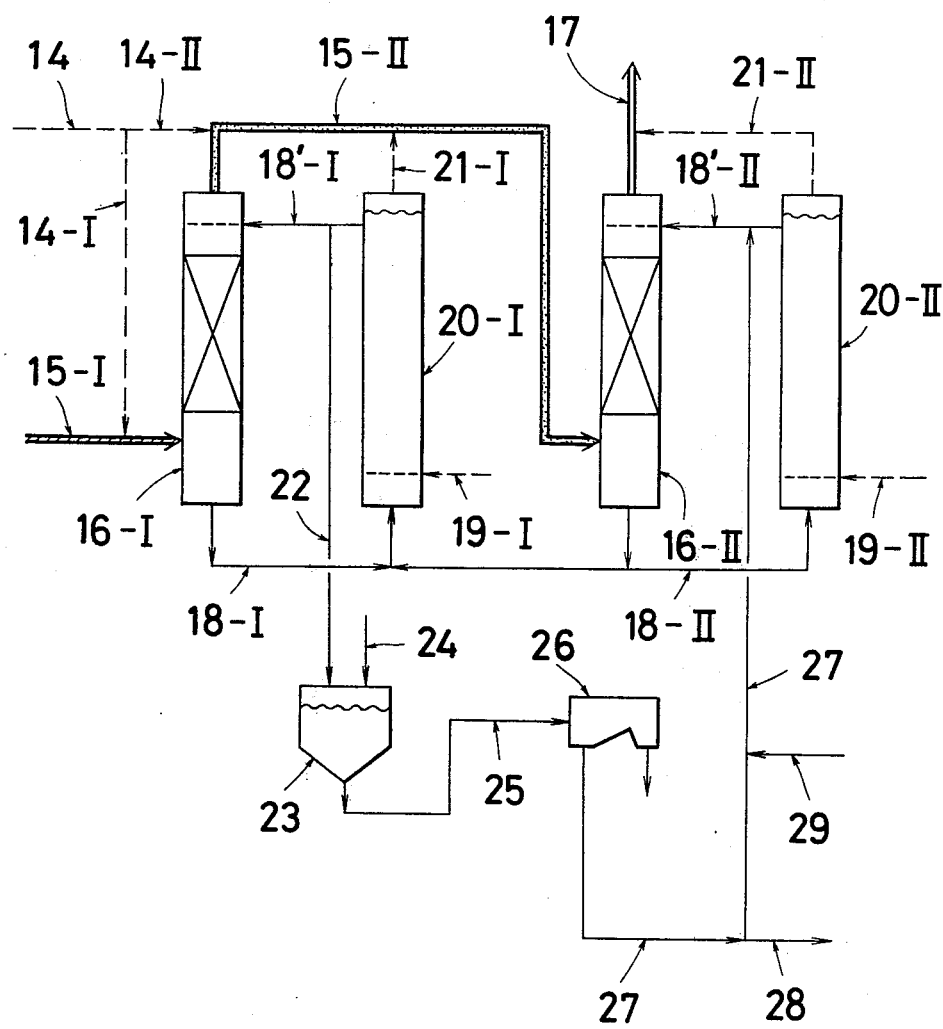
FIG. 7 is a process flow diagram illustrating one example of application of the method of this invention to multiple-stage operation, wherein addition of the ozone-containing gas is made at two points for effecting the ozone oxidation at two stages.

One preferred embodiment of the two-stage treatment wherein the addition of ozone is performed twice is illustrated in FIG. 7. In this flow diagram, the lines, paths and items of apparatus are denoted by the same numerals as used in FIG. 6. These numeral codes are suffixed by Roman numerals to discriminate between the lines, paths and items of apparatus for the first stage and those for the second stage. The operation of the treatments involved in the individual stages is totally identical with that of the treatments in the embodiment of FIG. 6.

With reference to FIG. 7, the waste gas led out of the smoke duct 15-I is mixed with an ozone-containing gas added through the line 14-I to have the degree of oxidation of $NO_x$ elevated. Then, it is sent into the absorption column 16-I of the unit for the first-stage treatment, wherein it is brought into contact with the liquid absorbent received from the recycling path 18'-I. The solution contacted with the waste gas in the absorption column 16-I is forwarded to the oxidation column 20-I through the path 18-I to oxidize the part of oxides still remaining in an unoxidized state and to reactivate the catalyst in the solution. The waste gas which has undergone the contact with the liquid absorbent is led via the duct 15-II. By this time, the ratio of NO to $NO_2$ in the waste gas has been increased because of the absorption treatment in the first stage. So, the ozone-containing gas is added again to the waste gas through the line 14-II to bring about an elevation of the degree of oxidation of $NO_x$. Subsequently, the waste gas is sent in the absorption column 16-II of the unit for the second-stage treatment, wherein it is again brought into contact with the liquid absorbent received from the recycling path 18'-II.

Since the percentage of denitrification and that of desulfurization increase in proportion as the degree of oxidation of $NO_x$ is elevated as described previously, the two stages of treatment given by the method of this invention permit the waste gas treatment to be accomplished at a high efficiency.

As for this invention described above, the principle, the method and the characteristic feature drived therefrom which the inventors have discovered and invented may be summarized as follows:

1. By the use of a solution comprising sulfuric acid, nitric acid, an iron compound as the catalyst and water, it is rendered feasible to deprive the waste gas of both $SO_x$ and $NO_x$ present therein, simultaneously.

2. The second step (step for oxidation) is employed to permit thorough regeneration of the absorbent by having air or oxygen introduced to effect oxidation on $SO_x$ and $NO_x$ which have been absorbed in the first step (step for absorption) but are still remaining partly in an unoxidized form and to provide reactivation of the catalyst which has taken part in the reaction of the first step and has consequently been degraded in the catalystic capacity thereof. By the circulation of the regenerated absorbent to the first step, therefore, continuous treatment of the waste gas can be attained.

3. As a result, it is rendered possible to have $SO_x$ in the waste gas oxidized to produce sulfuric acid which is one of the components of the absorbent, part of $NO_x$ oxidized into nitric acid which is another component of the absorbent and the remainder of $NO_x$ reduced into innoxious nitrogen gas and nitrous oxide gas which are safe for release into the atomoshpere.

4. By the addition of ozone, the waste gas is caused to have an increase in the value $x$ of $NO_x$ contained therein prior to the treatment for removal of noxious oxides. This addition of ozone materializes to advantage the inventors' discovery on the characteristic property of the absorbent that the percentage of denitrification increases in proportion as the value $x$ of $NO_x$ in the waste gas increases and therefore, enables the percentage of denitrification to be improved.

5. The percentage of desulfurization and that of denitrification are improved by simultaneous treatment of $SO_x$ and $NO_x$ in the waste gas. This simultaneous treatment represents an effective materialization of the inventors' further discovery on the characteristic property of the absorbent that when $SO_x$ and $NO_x$ present in the waste gas are simultaneously subjected to the treatment, desulfurization and denitrification of the waste gas are obtained at higher percentages because of the mutual coexistent effects of the two gases than when the gases are treated independently of each other.

6. As a result, by means of a method highly simplified in terms of both process and operation, simultaneous desulfurization and denitrification of the waste gas can be economically accomplished.

Working examples of the method according to the present invention are described below.

EXAMPLE 1

A bench test plant of the construction shown in the flow sheet of FIG. 6 was used, in which a column having an inside diameter of 60mm, provided with an insulating jacket and filled with Rasching rings 5 × 5mm to a height of 1,000mm was used as an absorber and a bubbling column having an inside diameter of 20mm and a height of 1,000mm and provided on the outside with an insulating jacket and at the bottom with a distributor for air blowing was used as an oxidizer. In this plant, a waste smoke discharged from a heavy oil-combustion boiler, sent through a water scrubber and containing 1500 ppm of $SO_2$, 190 ppm of NO, 10 ppm of $NO_2$ and 3.5% by volume of $O_2$ and at temperature about 55° to 65° C was subjected to treatment.

An air containing 1% by volume of ozone produced by a silent discharge type ozone generator was added to the waste smoke at the ratio of 2 N. liters/hour of the former to 200 N.liters/hour of the latter. Consequently, the value $x$ of $NO_x$ in the waste smoke was brought to about 1.55.

An aqueous solution containing 2.0% by weight of sulfuric acid, 1.0% by weight of nitric acid and 0.7% by weight of $Fe_2(SO_4)_3$ was used as a liquid absorbent, delivered to the absorber through its top at the rate of 10 liters/hour and brought into counterflow contact with said waste smoke. The treatment was carried out at 5520 C of the absorber interior temperature.

Into the oxidizer, air was delivered in the form of finely divided bubbles through a distributor at the rate of 4 N.liters/hour.

Part of the circulating liquid withdrawn from the oxidizer was led at the rate of 83 ml/hour to the gypsum crystallizer, in which the liquid was neutralized with calcium carbonate to pH 1 to cause production of gypsum dihydrate crystals. The resultant crystal-containing slurry was separated into gypsum dihydrate crystals and mother liquid by a centrifugal separator, with the mother liquid returned to the circulation step. Accumulation of nitric acid in the absorbent occurred at a very low rate of about 0.0035 g/liter-hour, a value so small that possible effect on the percentage of removal in the absorption step was negligible. Therefore, it was decided to carry out the operation of the withdrawal step and that of the makeup step intermittently. Thus, about 35.2 ml of the mother liquid was withdrawn at intervals of 10 hours. At the same time, to make up for the water which has been consumed in the various services in the system and the water and the ferric sulfate which had been withdrawn from the system, about 39.7 ml of an aqueous 0.62 wt% ferric sulfate solution (weakly acidic) was supplied through the makeup step at intervals of 10 hours. In this manner, the treatment was carried out maintaining the concentrations of the components in the system at constant levels.

As the result of the treatment described above, the effluent gas from the absorber contained 70 ppm of $SO_2$, 55 ppm of NO and 18 ppm of $NO_2$, indicating the percentage of desulfurization to be 95.1% and that of denitrification to be 62.5%.

EXAMPLE 2

The waste smoke having the same composition as that used in Example 1 was treated by using the plant of Example 1. An air containing 1% by volume of ozone produced by a silent discharge ozone generator was added at the ratio of 6.2 N.liters/hour to 200 N.liters/hour of the waste smoke to be treated. Consequently, the value $x$ of $NO_x$ in the waste smoke was brought to about 2.50. As a liquid absorbent, an aqueous solution containing 2.0% by weight of sulfuric acid, 1.0% by weight of nitric acid and 0.7% by weight of $Fe_2(SO_4)_3$ was delivered to the absorber through its top at the rate of 10 liters/hour and brought into counterflow contact with the waste smoke. The treatment was carried out at 55° C of the absorber interior temperature.

Into the oxidizer, air was delivered in the form of finely divided bubbles through the distributor at the rate of 4 N.liters/hour.

Part of the circulating liquid withdrawn from the oxidizer was led at the rate of 84 ml/hour to the gypsum crystallizer, wherein the liquid was neutralized with calcium carbonate to pH 1 to cause production of gypsum dihydrate crystals. The resultant crystal-containing slurry was separated into gypsum dihydrate crystals and mother liquid by the centrifugal separator, with the mother liquid returned to the circulation step.

Accumulation of nitric acid in the absorbent occurred at a very low rate of about 0.0101 g/liter-hour, a value so small that possible effect upon the removal of oxides in the absorption step was negligible. So, it was decided to carry out the operation of the withdrawal step and that of the makeup step intermittently. Thus, about 50.5 ml of the mother liquid was withdrawn and at the same time about 52.4 ml of an aqueous 0.67 wt% ferric sulfate solution (weakly acidic) was supplied through the makeup step at intervals of five hours. In this manner the treatment was carried out maintaining the concentrations of the components in the system at constant levels. As the result of the treatment described above, the effluent gas from the absorber contained 57 ppm of $SO_2$ and 19 ppm of $NO_x$, indicating the percentage of desulfurization to be 96.0% and that of denitrification to be 90.0%. No ozone was detected in the effluent gas.

EXAMPLE 3

The waste smoke of the same composition as that used in Example 1 was treated in the plant of Example 1. An air containing 0.3% by volume of ozone produced by a silent discharge type ozone generator was added at the rate of 2 N. liters/hour to 200 N.liters/hour of the waste smoke to be treated. Consequently, the value $x$ of $NO_x$ in the waste smoke was brought to about 1.2.

A aqueous solution containing 2.0% by weight of sulfuric acid, 1.0% by weight of nitric acid and 0.7% by weight of $Fe_2(SO_4)_3$ was delivered to the absorber through its top at the rate of 10 liters/hour and brought into counterflow contact with the waste smoke. The treatment was carried out at 55° C of the absorber interior temperature.

Into the oxidizer, air was delivered in the form of finely divided bubbles through the distributor at the rate of 4 N.liters/hour. Part of the circulating liquid withdrawn from the oxidizer was led at the rate of 81 ml/hour to the gypsum crystallizer, wherein it was neutralized with calcium carbonate to pH 1 to cause production of gypsum dihydrate crystals. The resultant crystal-containing slurry was separated into gypsum dihydrate crystals and mother liquid by the centrifugal separator, with the mother liquid returned to the circulating step.

Accumulation of nitric acid in the absorbent occurred at a very low rate of 0.0021 g/liter-hour, a value so small that possible effect on the removal of oxides in the absorption step was negligible. So, it was decided to carry out the operation of the withdrawal step and that of the makeup step intermittently. Thus about 21.4 ml of the mother liquid was withdrawn and at the same time about 26.0 ml of an aqueous 0.58 wt% ferric sulfate solution (weakly acidic) was supplied through the makeup step at intervals of ten hours. In this manner the treatment was carried out maintaining the concentrations of the components in the sytem at constant levels. As the result of the treatment described above, the effluent gas from the absorber contained 102 ppm of $SO_2$, 112 ppm of NO and 8 ppm of $NO_2$, indicating the percentage of desulfurization to be 93.0% and that of denitrification to be 38.0%.

COMPARATIVE EXAMPLE

By using the same plant as described in Example 1, a waste smoke discharged from a heavy oil-combustion boiler, sent through a water scrubber and containing 1500 ppm of $SO_2$, 200 ppm of NO and 3.5% by volume of $O_2$ was subjected to treatment at about 55° to 65° C. To the waste smoke delivered at the rate of 200 N.liters/hour no ozone was added. An aqueous solution containing 2.0% by weight of sulfuric acid, 1.0% by weight of nitric acid and 0.7% by weight of $Fe_2SO_4)_3$ was delivered into the absorber through its top at the rate of 10 liters/hour and brought into counterflow contact with the waste smoke. The treatment was carried out at 55° C of the absorber interior temperature.

Into the oxidizer, air was delivered in the form of finely divided bubbles through the distributor at the rate of 4 N.liters/hour. Part of the circulating withdrawn from the oxidizer was led at the rate of 77 ml/hour to be gypsum crystallizer, wherein it was neutralized with calcium carbonate to pH 1 to cause production of gypsum dihydrate crystals. The resultant crystal-containing slurry was separated into gypsum dihydrate crystals and mother liquid by the centrifugal separator, with the mother liquid returned to the circulation step.

The efficiency of nitrificaton was so inferior that the rate of accumulation of nitric acid in the absorbent was substantially below 1 ppm/hour, a value so small that possible effect on the removal of oxides in the absorption step was negligible. So, the treatment was carried out continuously for 24 hours without performing the operation of the withdrawal step or that of the makeup step. As the result of the treatment described above, the effluent gas from the absorber contained 176 ppm of $SO_2$ and 182 ppm of NO, indicating that the percentage of desulfurization to be 88.0% and that of denitrification to be 7.0%.

EXAMPLE 4

A pilot plant of the construction shown in the flow sheet of FIG. 6 was used, in which a column having an inside diameter of 800mm and an overall length of 13000mm and filled with Rashig rings to a height of 9000mm was used as an absorber and a bubbling column measurng 600mm in diameter and 1300mm in overall length, having ten sieve plates equidistantly spaced therein to prevent back-mixing of liquid and coalescing of bubbles and provided at the bottom with a distributor for air delivery was used as an oxidizer. In this pilot plant, a waste smoke discharged from a heavy oil-combustion boiler, sent through a water scrubber, containing 1500 ppm of $SO_2$, 190 ppm of NO, 10 ppm of $NO_2$ and 3.5% by volume of $O_2$ and at temperature of about 55° to 65° C was subjected to treatment.

An air containing 1% by volume of ozone produced by a silent discharge type ozone generator was added at the ratio of 31 $Nm^3$/hour to 1,000 $Nm^3$/hour at the waste smoke to be treated, consequently, the value $x$ of $NO_x$ in the waste smoke was brought to about 2.50. As the liquid absorbent, an aqueous solution containing 2.0% by weight of sulfuric acid, 1.0% by weight of nitric acid and 0.7% by weight of $Fe_2(SO_4)_3$ was delivered to the absorber through its top at the rate of 30,000 liters/hour and brought into counterflow contact with the waste smoke. The treatment carried out at 55° C of the absorber interior temperature.

Into the oxidizer, air was delivered at the rate of 20 $Nm^3$/hour. Part of the circulating liquid withdrawn from the oxidizer was led at the rate of 420 liters/hour to the gypsum crystallizer, wherein it was neutralized to pH 1 with calcium carbonate to cause production of gypsum dihydrate crystals. The resultant crystal-containing slurry was separated into gypsum dihydrate crystals and mother liquid by the centrifugal separator. Part of the mother liquid was withdrawn at the rate of about 50 liters/hour to the waste water treatment step and the remainder thereof was made up with an aqueous 0.67 wt% ferric sulfate solution (weakly acidic) at the rate of about 52 liters/hour through the make up step, and was then returned to the circulation system.

As the result of the continuous operation of the treatment described above, the effluent from the absorber contained 60 ppm of $SO_2$ and 21 ppm of $NO_x$, indicating the percentage of desulfurization to be 95.8% and that of denitrification to be 89.0%. No ozone was detected in the effluent.

What is claimed is:
1. A method fo simultaneous removal of $SO_x$ and $NO_x$ from the waste gas containing said oxides, which method comprises the steps of:

A. adding an ozone-containing gas to said waste gas at temperatures between about 15° C and about 100° C to oxidize the $NO_x$ so that the value $x$ in $NO_x$ in the waste gas is in the range of 1.2 to 2.5,
B. bringing said waste gas which has undergone treatment in step (A) into contact in a first zone with a solution containing sulfuric acid, nitric acid and ferric ion as a catalyst to remove $SO_x$ and $NO_x$ from said waste gas, said ferric ion content being in the range of from about 50 to 6,000 ppm by weight, and said nitric acid and sulfuric acid content being in the range of from about 0.05 to about 4% and from about 0.5 to about 10% respectively,
C. passing said solution resulting from step (B) from said first zone to a second zone,
D. introducing air or oxygen into the solution passed to said second zone in step (C) to effect oxidation of said $SO_x$ and $NO_x$ and activate the catalyst in said solution,
E. recycling the solution of the second zone into contact with waste gas in the first zone thereby establishing a circulation system between the first zone and second zone,
F. removing part of the solution from the circulation system, and
G. supplying make up water and make up catalyst to said circulation system.

2. The method of claim 1, wherein said ferric ion is obtained from at least one member selected from the group consisting of iron sulfate and iron nitrate.

3. The method of claim 1, wherein the part of the solution removed from the circulation system is treated with lime to have the contained sulfuric acid converted into gypsum, and the formed gypsum is recovered by separation from the gypsum-slurry.

4. The method of claim 3, wherein the mother liquid remaining after the removal of gypsum is returned to the absorption solution for use in the first zone.

* * * * *

UNITED STATES PATENT AND TRADEMARK OFFICE
CERTIFICATE OF CORRECTION

PATENT NO. : 4,011,298
DATED : March 8, 1977
INVENTOR(S) : Suguru Fukui, et al

It is certified that error appears in the above-identified patent and that said Letters Patent are hereby corrected as shown below:

75 Delete "Toshia Kuroda" and insert therefore--Toshio Kuroda--

Signed and Sealed this

Twenty-fourth Day of May 1977

[SEAL]

Attest:

RUTH C. MASON
*Attesting Officer*

C. MARSHALL DANN
*Commissioner of Patents and Trademarks*